July 25, 1939. W. T. TATE Re. 21,164
APPARATUS FOR LINING PIPES WITH CEMENTITIOUS MATERIAL
Original Filed April 13, 1932 2 Sheets-Sheet 1
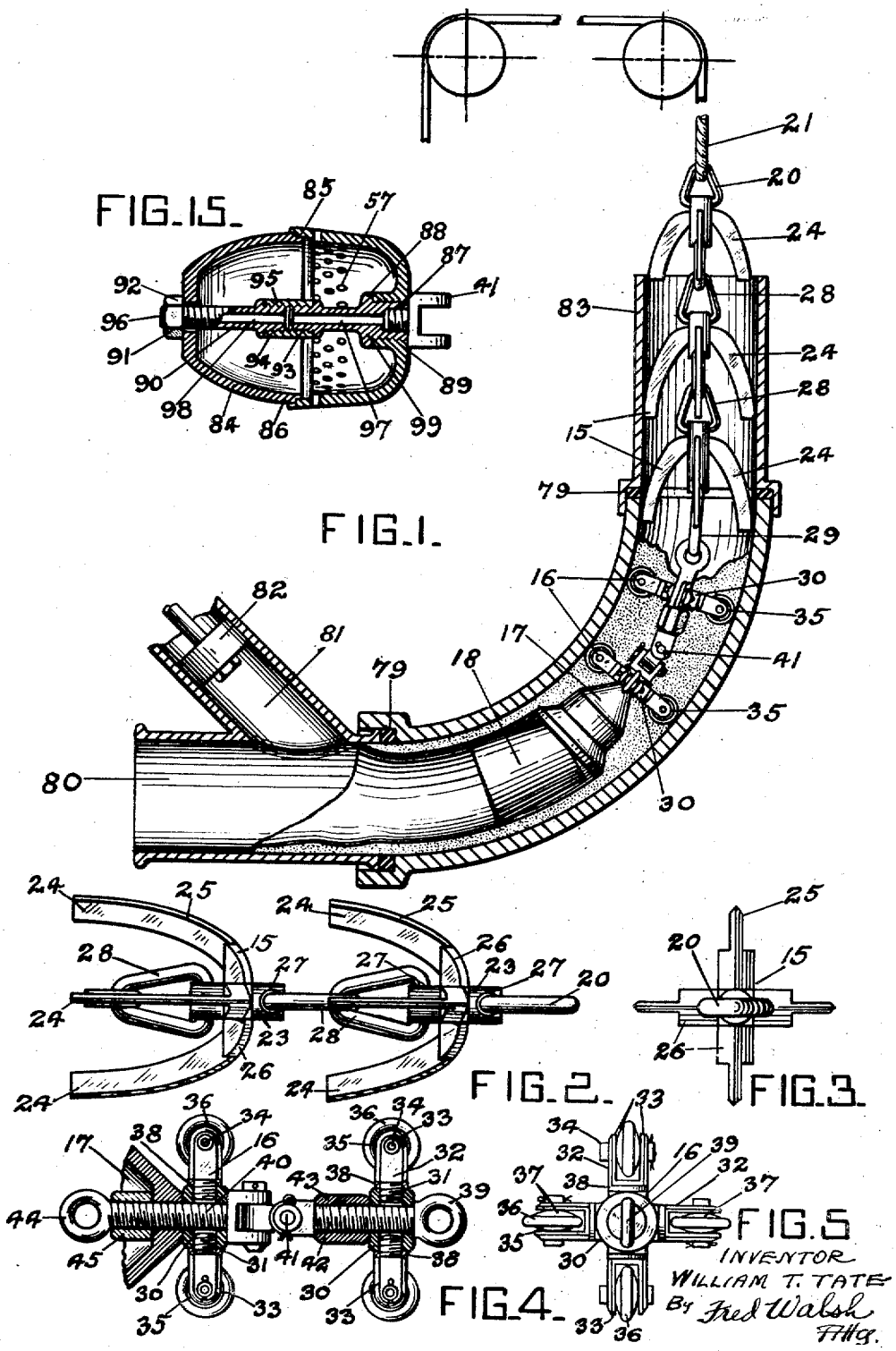

July 25, 1939. W. T. TATE Re. 21,164

APPARATUS FOR LINING PIPES WITH CEMENTITIOUS MATERIAL

Original Filed April 13, 1932 ? Sheets-Sheet 2

INVENTOR
WILLIAM T. TATE
By Fred Walsh
Atty.

Reissued July 25, 1939

Re. 21,164

UNITED STATES PATENT OFFICE 21,164

APPARATUS FOR LINING PIPES WITH CEMENTITIOUS MATERIAL

William Taren Tate, Manchester, England

Original No. 1,951,221, dated March 13, 1934, Serial No. 605,021, April 13, 1932. Application for reissue December 6, 1938, Serial No. 245,231. In Australia July 23, 1931

10 Claims. (Cl. 25—38)

This invention relates to a method and apparatus devised to provide a cheap and simple means for lining pipes with plastic cementitious material particularly cement and sand concrete and especially for lining pipes of small bore say up to six inches diameter (though it may be advantageously used for lining larger pipes) and it is particularly useful for lining pipe bends and will provide an even lining in such pipes irrespective of the radius of the bend.

This improved apparatus for lining pipes with plastic concrete in its most elementary form is constituted of a spreader whose maximum cross section is the same in size and configuration as the bore of the pipe when lined, one or more spreader guides universally or otherwise shackled to each other and to the spreader or may be integral therewith, a cable attached to the leading guide and hauling mechanism for said cable.

The spreader is more or less bell shaped preferably of metal having a conical or "bull" nose from which it is stepped or tapered to a trailing skirt and this skirt is hollow and has a multiplicity of small dehydrator holes through the periphery thereof. The spreader may be in one or a plurality of parts either shackled together (universally or otherwise) or directly and rigidly attached to each other and in all cases whether the spreader is of single or of multiple construction the foremost portion functions as a plastic concrete distributor and the rearmost portion as a lining compressor and smoother. A float may be incorporated with the spreader to follow it through the pipe and is especially useful to amalgamate cementitious drippings from the dehydrator holes with the lining, and such float is cylindrical or part conical and is of slightly smaller diameter than the pipe lining.

The mentioned float may be replaced by an end cap which seals the open end of the skirt so that the cementitious infiltrations through the dehydrating orifices are contained within the spreader or skirt thereof and if lengthy pipes (whether straight or curved) are being lined and the volumetric capacity of the spreader and/or skirt is likely to be insufficient to house the total infiltration then said cap may be hollow and (cylindrically conically or as a dome) protrude rearwardly from the skirt end and so supplement the skirt's capacity.

The guides are constituted of a plurality of arms (preferably four) radiating from a boss and these arms may have bifurcated ends forming bearings for resilient rubber tyred rollers or said arms may have rearwardly set prongs which neatly but resiliently fit the bore of an unlined pipe.

These guides maintain the spreader in true axial alignment in the pipe and are preferably used in multiple and the nose of the spreader may have guides incorporated therewith. The guides are adapted to be shackled together with universal couplings therebetween in a train and the spreader is shackled to the rear end thereof with the float as a follower and the leading guide is coupled to a hauling cable.

The pipe is preferably lined from the flange end and has a hopper affixed thereto having a delivery chute the same bore as the pipe and coaxial therewith and having a feeding chute and devices say a ram to force concrete into the pipe. At the spigot end of the pipe a finishing guide tube is affixed and this is provided to ensure centralized drawing of the lining apparatus and a flush and even lining of concrete at the end of the pipe.

The apparatus may be used to line pipes in the workshop or in situ but in order that the invention may be readily carried into practical effect several embodiments thereof will now be described with reference to the drawings accompanying and forming part of this complete specification.

Fig. 1 depicts more or less schematically a sectional general arrangement of the apparatus in operation.

Figs. 2 and 3 are respectively side and end elevations of one form of foremost guides.

Figs. 4 and 5 are respectively sectional and end elevations of one form of rear-most guides.

Fig. 15 is a sectional view of a dehydraulic spreader having a domed end cap affixed thereto.

Figure 6:
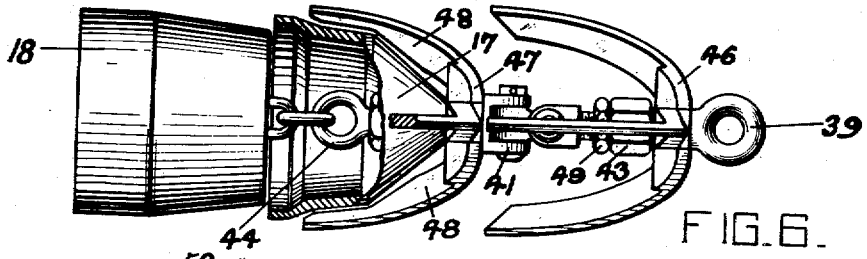
Fig. 6 is a part sectional elevation of one form of rear-most guides and spreader.

An assembly of the apparatus to line a pipe is made from such parts as the particular type of pipe (that is bends or straights) require; likewise the distance between the several parts is determined by the type of pipe to be lined and in the case of bends the parts are grouped according to the radius of the pipe to assure that the spreader travels medially through the pipe.

A simple assembly of the apparatus is constituted of a plurality of fore guides 15 and rear guides 16 (though the fore guides only may be advantageously used) to the last of which is attached by screwing or maybe by coupling a spreader which may consist of a distributor 17 only or such distributor 17 and a trailing smoother 18 or alternatively a float 19 or a combination of all three mentioned parts.

The foremost guide has shackle-ring 20 to which is coupled hauling cable 21 having any suitable winching gear (not shown).

The fore guides 15 consist of hubs 23 from which are a plurality of spring radial arms 24 curved to project rearwardly and gradually to a maximum diameter which is less than that of the unlined pipe by working clearance only. Preferably such guides have four arms (especially for lining bends) for four arms enable pipe fins and like excrescences as those—in a bend—formed in the manufacture of the pipe by the meeting edges of the mold to be avoided. The resiliency of the arms is sufficient to enable them to be forced over any small protuberances in the pipe should any of same be encountered. The radial arms 24 and the hubs 23 have their surfaces chamfered or rounded wherever practicable as at 25 and 26 in order to reduce the head resistance thereof. The hubs 23 have orifices 27 therein for the affixture of shackles or coupling links 28 or of a single link 29 to the rear guides 16.

The rear guides 16 consist of hubs 30 having peripheral screwed orifices therein for the screwed ends 31 of bifurcated arms 32 the limbs 33 of which have bearings therein for the axle pin 34 of a roller 35 having tyre 36 of soft rubber or the like. The roller side faces 37 are rounded as shown to facilitate the removal of adhering concrete thereto and the limbs 33 are chamfered to reduce head resistance. The arms 32 may have distance washers 38 of varying thicknesses interposed upon their screwed shanks 31 to accommodate the guides to pipes of different diameters. The hubs 30 have axial screwed orifices therein to take an eyelet bolt 39 or universal shank 40 as the case may be. A universal joint 41 is provided in the connection of two guides such as 16 one shank 42 being connected to eyelet bolt 39 by nut 43 and shank 40 carrying the rearmost guide and the spreader 17 and also an eyelet bolt 44 (for the connection of a smoother or float if required) by means of nut 45. The nuts 43 and 45 may be of any desired length to enable varying adjustment of the apparatus for pipes of different radii or for other reasons.

In the form of rear guides depicted in Fig. 6 rollers are dispensed with and the guides 46 and 47 are of similar construction to the fore guides 15 previously described with the exception that guide 47 has its arms 48 shaped complementarily to the nose of the distributor 17. In any or all of the constructions described and illustrated a locknut 49 may be incorporated behind the nuts 43 or 45 to enable still finer adjustments thereof. This Fig. 6 also depicts the smoother 18 shackled to the spreader by eyelet bolt 44.

Figure 7:
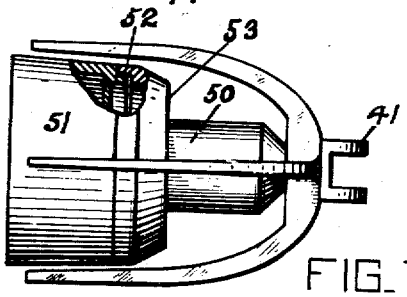
Figs. 7 and 8 are side and end elevations of a spreader and guide therefor of somewhat modified construction.
Figure 8:
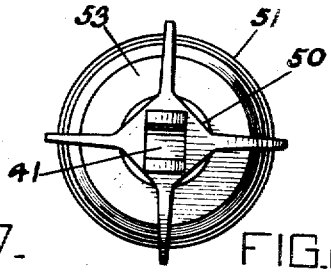

In the construction depicted in Figs. 7 and 8 the spreader is made of two parts 50 and 51 the one screwing within the other as at 52 which enables a skirt or smoother 51 of any desired length being incorporated. The fore part 50 of this spreader is stepped as at 53 and is particularly useful in the lining of lengthy pipes as the abutment shoulder formed by the step facilitates the forward carriage of the surplus concrete.

Figure 9:
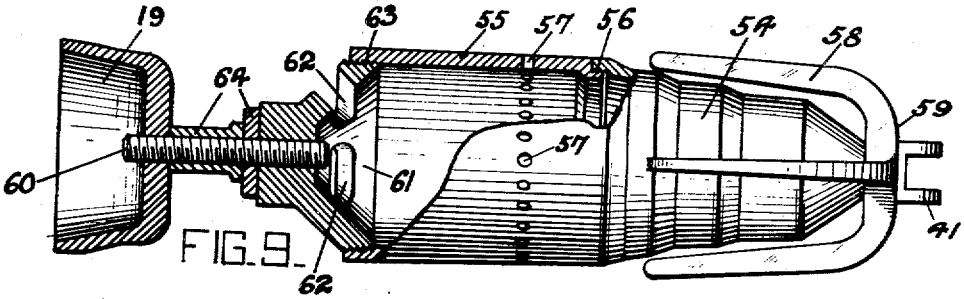
Fig. 9 is an elevation of a spreader and guide therefor particularly useful for the lining of straight pipes.

In the construction depicted in Fig. 9 the spreader is made of two parts 54 and 55 screwed as at 56 and a trailing float 19, this type of spreader being eminently adapted for the lining of straight pipes. The skirt 55 is provided with circumferential orifices 57 which assist in the dehydration of the concrete by infiltration therethrough of the liquid content thereof and also the arms 58 of the guide 59 more or less closely if not contactingly conform to the configuration of the spreader in order to support the weight thereof and assist in maintaining the spreader medially in the pipe.

The trailing float 19 (which may be made of rubber or the like) may be shackled to the spreader but preferably has a screwed orifice to take on one end of a stem 60 which at its other end homes in a support 61 having orifices 62 therein and said support is adapted to screw into the end of the skirt 55 as indicated at 63. Distance pieces 64 are interposed between said support 61 and the float 19.

Figure 10:
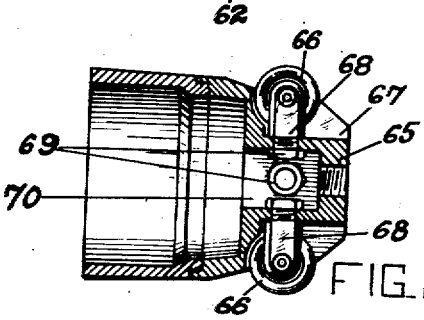
Figs. 10 and 11 are respectively sectional and end elevations of a spreader and guides of modified construction.
Figure 11:
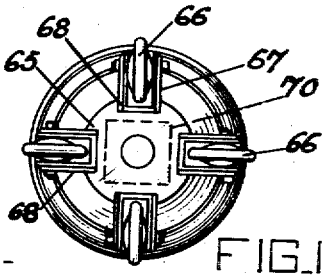

In the construction shown in Figs. 10 and 11 a spreader 65 has roller guides 66 integrally incorporated therewith. The fore part of the spreader has radial slots 67 which neatly house arms 68 secured by nuts 69 within a cavity 70 in the spreader.

Figure 12:
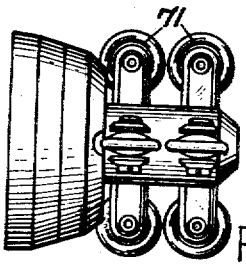
Fig. 12 is a side elevation of a spreader and guides of still further modification construction.

In the spreader shown in Fig. 12 tandem roller guides as 71 are provided. The guides are of similar construction to those earlier described herein and are arranged in tandem to support the weight of the spreader. This arrangement is useful where a heavy spreader is employed.

Figure 13:
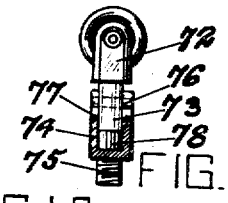
Figs. 13 and 14 are respectively sectional and end elevation of a cushioned guide roller pedestal.
Figure 14:
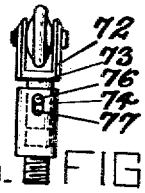

The arm shown in Figs. 13 and 14 is for use with the several roller guides and/or spreaders hereinbefore described when the pipe to be lined has a rough or otherwise irregular bore and consequently a greater degree of cushioning and/or resiliency is required to enable the guides to freely traverse same. The arm 72 has a shank 73 neatly fitting a cylinder 74 having screwed shank 75 and the shank 73 is furnished with a diametrical pin or keeper 76 whose ends are vertically slidable in slots 77 in the walls of the cylinder 74. A cushion or buffer 78 of rubber or like resilient material is interposed between the end of the shank 73 and the floor of the cylinder 74.

The spreader sectionally depicted in Fig. 15 has a multiplicity of dehydrator orifices 57 therein and has a domed end cap 84 attached thereto. The shape depicted is for use with curved pipes and is so domed to provide clearance for the infiltration reservoir which said domed portion constitutes in the lining of straight pipes the end cap may be cylindrical or any other desired shape and where the spreader has a lengthy skirt (as that numbered 55 in Fig. 9) said cap may be merely a disc.

In the form of sealing joint for cap and skirt shown the skirt has an interiorly stepped end 85 and the cap 84 has a complementarily stepped end 86. The spreader has a screwed bore 87 within which homes a cap connecting piece 88 screwed as at 89 for the affixture of a universal joint as 41 or other shackling means, a second connecting piece 90 is screwed as at 91 for a nut 92 which clamps the cap 84 on its stepped seating 85. The inner ends 93 and 94 of the pieces 88 and 90 both house within a sleeve 95 which is of such a length as to ensure that the end 96 of the piece 90 does not protrude sufficiently out of the nut 92 as to be likely to contact the pipe lining. The two pieces 88 and 90 have medial bores 97 and 98 respectively and an air duct 99 opening into one of said bores so that in the event of the spreader and cap becoming full or nearly so the infiltration will discharge from the end 96 instead of preventing further infiltration through the orifices 57.

In workshop use a pipe to be lined as for example that shown in Fig. 1 is rigidly held in the position shown and rubber or leather washers 79 are placed at each end thereof and at the lower end a delivery chute 80 is affixed by any suitable clamping device. The delivery chute has a feeding chute 81 with a ram 82 or other device to force concrete into a pipe and the other end of the pipe has a finishing guide tube 83 clamped thereto. One end of the cable 21 is first passed through the pipe and made fast to the winching gear and concrete is then fed thereto in sufficient quantity to provide an inert weight of concrete to insure package of same onto the walls of the pipe as the spreader is drawn therethrough. A train of guides and spreader is then coupled to the free end of the cable and the winching gear operated to draw the apparatus through the pipe. The guides ensure that the cable hauling the spreader and also the spreader is travelled centrally through the pipe and the fore portion of the spreader forcibly thrusts the concrete against the pipe walls and forms a lining thereof while the skirt of the spreader further compresses the lining and smoothes same to a finish and to the required diameter. A float such as 19 is preferably coupled behind the spreader to smooth out and amalgamate with the lining the small amount of cementitious drippings passing through the dehydrator orifices or said orificed spreader is provided with an end cap such as 84.

For the lining of pipes in situ provision is made to feed concrete into the pipe at predetermined distances therealong the distance being determined by the speed at which the apparatus can be travelled through the pipe and the volume of concrete that can be forced along the pipe by it.

The several constructions of the different parts constituting this invention that have been described and illustrated have been found to meet most requirements as regards the pipes and the concrete available at the date hereof at applicant's place of business before mentioned. But it is to be clearly understood that applicant is not confined to the particular construction described and illustrated for once the invention is understood many variations of the parts or integers thereof may suggest themselves to those skilled in the art to which this said invention appertains. For example the spreader may be cylindrical in shape with but a slightly tapered nosing or any number of guides and/or spreaders might be advantageously used or the washers 38 may be used in conjunction with any of the roller guides described and illustrated or the dehydration orifices 57 could be used in any type of spreaders or again any or all of the couplings used may be universal couplings or alternatively link shackles. Further although the invention has been described as for lining pipes with concrete it can equally as well be applied to the lining of pipes with any plastic material.

I claim:

1. Improved apparatus for lining pipes with plastic cementitious material constituted of a spreader whose maximum cross section is of the same size and configuration as the required finished bore of the pipe when lined and which is increasingly flared from its leading to its trailing ends and which has a plurality of radial dehydrating orifices adjacent said trailing end, a trailing float whose maximum cross section is not greater than the maximum cross section of said spreader, one or more positioning guides for and connected to said spreader all universally coupled together, and a hauling cable attached to the foremost of said guides.

2. Improved apparatus for lining pipes with plastic cementitious material constituted of a spreader whose maximum cross section is of the same size and configuration as the required finished bore of the pipe when lined and which is increasingly flared from its leading to its trailing ends and which has a plurality of radial dehydrating orifices adjacent said trailing end, an end sealing cap for said spreader whose maximum cross section is not greater than the maximum cross section of said spreader, one or more positioning guides for and connected to said spreader all universally coupled together, and a hauling cable attached to the foremost of said guides.

3. In apparatus for lining pipes, a spreader, a train of spreader guides the last of which is rigidly affixed coaxially to the spreader, universal joints coupling said guides together, and means to adjust the distance between said guides substantially as herein described and explained.

4. Apparatus for lining pipes with plastic material comprising a spreader whose maximum cross section is of the same size and configuration as the required finished bore of the pipe when lined and which is increasingly flared from its leading to its trailing ends and which has a plurality of radial dehydrating orifices adjacent said trailing end, a train of spreader guides the last of which is rigidly affixed coaxially to the spreader, universal joints to couple said guides together and means to adjust the distance between said guides.

5. An apparatus for lining pipes in situ with plastic material including a spreader whose maximum cross section is of the same size and configuration as the required finished bore of the pipe when lined comprising an elongated conical nose, a flaring hollow skirt secured to the base of the nose having a plurality of dehydrating openings therein intermediate the nose and the trailing end of the skirt, a hub on the end of said nose, a universal joint connection on said hub, a plurality of guide arms radiating outwardly from the hub intermediate the nose and universal joint connection and extending rearwardly over the said nose, a chain of guides in axial alignment universally coupled together having a universal joint connection complementary to said universal connection on the hub adapted to couple the chain of guides and spreader together and a hauling cable attached to the foremost guide in the chain.

6. The apparatus as described in claim 3 in which the said last spreader guide affixed coaxially to the spreader comprises a plurality of arms radiating outwardly and rearwardly over the leading end of the spreader.

7. The apparatus as described in claim 3 in which the spreader comprises a hollow skirt with dehydrating openings.

8. The apparatus as described in claim 4, in which the said last spreader guide affixed to the spreader comprises a plurality of flexible guide arms radially projecting from the leading end of the spreader and extending about the spreader toward the said trailing end of the spreader.

9. The apparatus described in claim 1 in which one of said guides is affixed to the leading end of the spreader and comprises a plurality of flexible arms extending toward the trailing end of the spreader over the leading end thereof.

10. The apparatus described in claim 2 in which one of said guides is affixed to the leading end of the spreader and includes a plurality of elongated flexible arms radiating from the leading end of the spreader and extending rearwardly over the leading end of said spreader.

WILLIAM TAREN TATE.